(12) United States Patent
Dinale et al.

(10) Patent No.: US 12,414,641 B2
(45) Date of Patent: Sep. 16, 2025

(54) OBJECT-HANGING DEVICE

(71) Applicant: FAMI S.R.L., Rosa' (IT)

(72) Inventors: Paolo Dinale, Marostica (IT); Marco Fietta, Tezze sul Brenta (IT)

(73) Assignee: FAMI S.R.L., Rosa' (IT)

( * ) Notice: Subject to any disclaimer, the term of this patent is extended or adjusted under 35 U.S.C. 154(b) by 27 days.

(21) Appl. No.: 18/390,843

(22) Filed: Dec. 20, 2023

(65) Prior Publication Data
US 2024/0215739 A1  Jul. 4, 2024

(30) Foreign Application Priority Data
Dec. 28, 2022  (IT) .................. 102022000026955

(51) Int. Cl.
*A47F 5/08*  (2006.01)

(52) U.S. Cl.
CPC .................. *A47F 5/0823* (2013.01)

(58) Field of Classification Search
CPC ........ A47F 5/0823; A47F 5/0861; A47F 5/08; A47F 5/0846; A47F 5/0815; F16B 2200/20
USPC ................................. 248/220.31
See application file for complete search history.

(56) References Cited

U.S. PATENT DOCUMENTS

| | | | |
|---|---|---|---|
| 3,715,096 A * | 2/1973 | Filbert | A47F 5/0823 248/220.22 |
| 4,258,892 A | 3/1981 | Craine | |
| 4,289,242 A * | 9/1981 | Kenyon | A47F 5/0861 211/59.1 |
| 5,180,128 A * | 1/1993 | Massey | A47F 5/0823 D8/367 |
| 10,827,853 B2 * | 11/2020 | Ma | E05B 65/00 |
| 2003/0230018 A1 * | 12/2003 | Poulokefalos | A47F 5/0823 40/642.02 |
| 2005/0029205 A1 * | 2/2005 | Mansfield | A47F 5/0861 211/7 |
| 2009/0049723 A1 * | 2/2009 | Arndt | A47F 5/0823 40/642.01 |
| 2009/0173853 A1 * | 7/2009 | Fawcett | A47F 5/0861 248/220.31 |
| 2019/0290023 A1 * | 9/2019 | Ma | A47F 5/0861 |

OTHER PUBLICATIONS

Italian Search Report, issued in IT 2022/00026955 on May 3, 2023, 8 pages.

* cited by examiner

*Primary Examiner* — Christopher Garft
(74) *Attorney, Agent, or Firm* — Chrisman Gallo Tochtrop LLC (57) ABSTRACT

Object-hanging device (1), intended to couple reversibly with a support wall (2) with a vertical extension and equipped with suitable through holes (3), comprising a support body (10), intended to support in suspension an external object and a fixing body (100), adapted to reversibly engage with the support body (10) to couple the support body (10) reversibly with the wall (2).

11 Claims, 4 Drawing Sheets

OBJECT-HANGING DEVICE

The object of the present invention is an object-hanging device intended to be coupled reversibly with a support wall with a vertical extension and equipped with suitable through holes.

A support wall means an object designed to exhibit objects on walls or on other vertical surfaces.

For example, the wall can be employed for use in workshops or warehouses or other work areas in which work tools are required that are arranged visibly so as to be able to be exploited rapidly when required.

Alternatively, this wall can be used as an element to exhibit objects or products to the public. For example, the wall can be installed in a shop window or inside premises used for commercial activities or in trade fairs. Using object-hanging devices arranged on drilled support walls is rather common in the prior art. Such walls generally have a flat shape and comprise a first side and a second side. These walls are provided with a plurality of holes, arranged respectively at regular intervals both horizontally and vertically, forming a matrix of holes. These holes are generally square or rectangular in shape and pass through the thickness of the wall.

Generally, this wall has a frontal surface, exposed towards the observer, and a rear surface, arranged opposite the wall relative to the frontal surface and an object-hanging device is arranged on the frontal surface of the wall. A common embodiment of this device comprises suitable rear hooking teeth that are engaged inside the holes of the wall as supports, or in other words hooking onto these holes of the wall so as to maintain the objects hanging. Disadvantageously, this type of device is not fixed and has a great risk of unhooking from the support wall in the event of an accidental collision with an operator, especially if this collision comes from below.

In order to overcome this drawback, there are different systems in the prior art for improving fixing such devices to the support walls.

The most common system is using auxiliary fixing systems using screwing members. Nevertheless, these systems, in addition to being costly, are laborious to install and remove because they need equipment for screwing the members tight. This aspect is particularly disadvantageous during exhibiting at trade fairs where dressing the wall and relative objects being exhibited is required within a short time but at the same time solid and secure fixing of the objects to the wall is required.

Alternative fixing system can include devices using pressure-locking systems where the systems work by means of mechanical interference or friction. In particular, these systems comprise connecting members that are insertable into the holes and compatible in shape therewith.

Disadvantageously, these systems on the other hand do not ensure a sufficiently secure lock of the device on the wall, in particular in the case of vibrations, which would tend to unhook the device from the wall.

The technical task of the present invention is to provide an object-hanging device intended for being coupled reversibly with a support wall that enables the drawbacks that have emerged from the prior art to be overcome.

One object of the present invention is accordingly to provide an object-hanging device that is easily installable and uninstallable in a reversible manner.

A further object of the present invention is to provide an object-hanging device that does not rotate or unhook if the wall is stressed by impacts or vibrations, and in particular, that prevents unhooking from this support wall in the event of an impact from below arising from an accidental collision with an operator.

A further object of the present invention is to provide an object-hanging device that is cheap, easily makeable and reusable.

The technical task set and the objects specified are substantially attained by an object-hanging device according to the technical features as set out in one or more of the accompanying claims.

In particular, the technical task set and the objects specified are substantially achieved by an object-hanging device comprising a support body and a fixing body.

The fixing body comprises a first portion configured to make a rest and/or a stop for an object and a second portion configured to make a reversible connection between the support body and the support wall.

The fixing body is reversibly engageable or engaged with the first portion and/or with the second portion in a use configuration of the object-hanging device.

According to one aspect of the present invention, the fixing body is reversibly interposed between the first portion and the second portion in the use configuration of the object-hanging device.

In the use configuration, the second portion is at least partially inserted inside at least one of the holes so as to define an anchoring of the support body on the wall.

In the use configuration, the fixing body exerts a first thrust action and a second thrust action, opposite the first thrust action, respectively acting on the first portion, and/or on the second portion, and on the wall so as to define stable anchoring of the support body on the wall.

According to one aspect of the present invention, the first portion preferably has a longitudinal dimension that is more extended than the other dimensions. The longitudinal geometry of the first portion can be respectively at least partially linear or broken or curved. The first portion has two ends, a first end of which is engaged with an external object whereas a second end is arranged near or adhering to the wall and can comprise a geometry that is such as to form an auxiliary support rest for the wall.

According to one aspect of the present invention, the first portion extends along its longitudinal axis, having a first end and a second end provided with respective transverse elements, said transverse elements being opposite one another relative to said longitudinal axis: a first transverse element is arranged along the first end and engages with the external object and a second transverse end is adapted to provide a rest against the frontal surface of the wall.

According to one aspect of the present invention, the fixing body engages the support body along the frontal surface of the wall, engaging respectively with the support body, with the first section and/or with the second section, anchoring the support body to the frontal surface of the wall.

According to one aspect of the present invention, the fixing body comprises at least one first seat suitable for receiving a longitudinal portion of said first portion of the support body. This seat can be so arranged as to engage with said support body arranged outside or inside the fixing body.

According to a further aspect of the present invention, the fixing body is so configured as to prevent the support body from rotating around any axis perpendicular to the wall.

According to one aspect of the present invention, the support body can further comprise a third portion, defined between said first portion and said second portion, defining a housing for or an element for coupling with said fixing body.

According to a different aspect of the present invention, the support body has an overall belt-shaped geometry. The second portion is inserted into a through hole on the support wall and has a linear rest on the rear surface of the support wall. The first portion, with a substantially linear geometry, is arranged on the frontal surface of the wall. The fixing body is so configured as to receive internally in a suitable hole the first portion and to retain by means of an internal gripping member.

Advantageously, using a device comprising a support body and a fixing body that is reversibly engageable with the support body permits a reversible coupling with the support wall, anyway ensuring that the device is stably anchored on the wall and is not subjected to involuntary movements, whether in the event of impacts or of vibrations.

Advantageously, the above device is easy to install and uninstall.

Further, the device is realizable easily and economically.

Further, the device is easily reusable to support objects.

Additional features and advantages of the present invention will become more apparent from the indicative and thus non-limiting description of a preferred but not exclusive embodiment of an object-hanging device intended to couple reversibly to a support wall with a vertical extension and equipped with suitable through holes.

Such a description will be set out below with reference to the accompanying drawings, which are provided solely for illustrative and therefore non-limiting purposes, in which.

With reference to the appended figures, 1 denotes an object-hanging device intended to be coupled reversibly with a support wall 2 with a vertical extension and equipped with suitable through holes 3.

The support wall 2 can be of any type present in the prior art. The wall 2 shows a frontal surface 2a and a rear surface 2b.

The term "frontal" means the surface arranged opposite an observer, i.e. directly in view relative to the point of view of the observer.

The wall 2 can have a thickness of different values, but this thickness is preferably constant along the entire body of the wall 2. The holes 3 can have different geometries and dimensions, preferably with a square or rectangular geometry and dimensions compatible with other fixing devices present in the prior art, having still more preferably a horizontal and/or vertical dimension comprised between 5 mm and 50 mm. The holes 3 are preferably arranged reciprocally vertically and/or horizontally at fixed distances, constituting regular vertical and/or horizontal series that therefore define a matrix of holes that is distributed regularly on the wall 2.

The device 1 is intended to support an external object (not shown) suspended along the wall 2, in particular exerting a constraining reaction opposing the weight force "P" of the object.

The device 1 comprises a support body 10 and a fixing body 100.

The support body 10 and the fixing body 100 can consist of different, preferably rigid, materials with great mechanical resistance to stress.

Coupling with the wall can comprise a direct contact with the wall 2 or by means of coatings affecting the contact zones of the fixing body 100 or of the support wall 10 with the wall, which are preferably rough and/or rubberized, to improve the stability of the contact with the wall 2.

The support body 10 comprises a first portion 11 configured to make a rest and/or a stop for the external object to be hung along the wall 2 and a second portion configured to make a reversible connection between the support body 10 and the support wall 2.

In particular, the first portion 11 can comprise sections of different geometry, selected according to the type of object to be supported. Advantageously, the geometry of the first portion 11 can allow great flexibility of use of the object-hanging device 1, which can accordingly support objects of different shapes and/or dimensions.

The first portion 11 can be arranged cantilevered on the frontal surface 2a of the wall 2, perpendicularly or askew relative to the frontal surface 2a of the wall 2 in function of the type of external object to be supported.

Preferably, the first portion 11 has a geometry that is more developed along the longitudinal dimension than over the other dimensions.

The longitudinal geometry can be respectively at least partially linear or broken or curved.

The first portion 11 has two ends, a first end 11a of which is preferably free and dedicated to engaging with the external object whilst a second end 11b is arranged near or adhering to the frontal surface 2a of the wall 2.

According to the embodiment illustrated into the present figures, the first portion 11 extends along a longitudinal axis "S" thereof, in a substantially linear manner, and has a first end 11a and a second end 11b preferably provided with respective transverse elements. The transverse elements are opposite one another relative to the longitudinal axis "S".

Preferably, a first transverse element 11c is arranged along the first end 11a and is dedicated to engaging with the external object and a second transverse element 11d is arranged along the second end 11b and is adapted to form an auxiliary support rest 6 against the frontal surface 2a of the wall 2. The presence of the transverse elements 11c and 11d is optional; nevertheless, the presence of the second transverse element 11d and the support rest 6 deriving therefrom may be necessary if the weight of the body to be maintained suspended may cause involuntary bending of the support body 10.

The second portion 12 is at least partially inserted between at least one of the through holes 3 so as to define anchoring of the support body 10 to the wall 2. When the device 1 is in a use configuration, the second portion 12 engages with the rear surface 2b of the wall 2, having at least one rest 4 on the rear surface 2b. In particular, the second portion 12 has a first sub-portion 12a intended to remain at least partially inside the hole 3, arranged or suspended through the hole 3 or resting on an inner surface 5 of the hole 3.

Further, the second portion 12 has a second sub-portion 12b intended to form the rest 4 on the rear surface 2b of the wall 2. This second sub-portion 12b is arranged preferably transversely with respect to the first sub-portion 12a and along the rear surface 2b of the wall 2.

The sub-portion 12b can have different geometric shapes so as to constitute different types of rest 4 like, for example, a point-like, linear or surface rest. Preferably, both the first portion 11, comprising the first transverse element 11c and the second transverse element 11d, and the second portion 12, comprising the first sub-portion 12a and the second sub-portion 12b, can be made into separable and reciprocally assemblable modules. This separation into modules can apply to one or more of the elements constituting the support body 10.

Alternatively, the different elements disclosed above that constitute the support body 10 can be made "in a single piece".

The fixing body 100 can be reversibly engaged with the first portion 11 and/or with the second portion 12 when the object-hanging device 1 is in a use configuration. The fixing body 100 exerts a first thrust action "A" and a second thrust action "B", opposite the first thrust action "A", respectively acting on the first portion 11, and/or on the second portion 12, and on the wall 2 so as to define stable anchoring of the support body 10 on the wall 2. In the embodiment illustrated in the appended figures, the fixing body 100 is arranged along the frontal surface 2a of the wall 2, engaging respectively with the support body 10, and in particular with the first section 11 and/or with the second section 12, and the frontal surface 2a.

The fixing body 100 thus exerts thrust action "B" on the frontal surface 2a of the wall 2. The rest 4 on the other hand helps couple the device 1 with the wall 2, by means of a thrust action "C" on the rear surface 2b of the wall 2. As this thrust action "C" opposes the action "B", the device 1 performs a "gripping" action relative to the wall 2.

If the second transverse element 11d is present, the transverse element 11d exerts a further thrust action "D" on the frontal surface 2a of the wall 2 opposing the weight "P" of the external object engaged on the device 1.

Preferably, this transverse element is oriented to the floor where the support wall rests, exerting the thrust action "D" in an area on the frontal surface 2a of the wall arranged below the holes 3 receiving the second sub-portion 12b so as to provide support from below to the support body 10.

In the embodiment illustrated in the appended figures, the fixing body 100 is so constituted as to comprise at least one first seat 101 suitable for receiving at least one longitudinal portion of the first portion 11 of the support body 10. This seat 101 can be so engaged as to engage the first portion 11 and/or the support body 100.

This engagement can be inside the fixing body 100 or, alternatively, outside, so as to solidly anchor the first portion 11 to the support body 100 by means of suitable connecting members and to avoid involuntary shifts of the first portion relative to the support body 100 and, consequently, relative to the wall 2.

The fixing body 100 is also configured prevent rotation of the support body 10 relative to the wall 2.

With reference to the appended figures, the fixing body can comprise a main component 110, suitable for exerting the first thrust action "A" and the second thrust action "B", and a support component 120, reversibly connected to the main component 110 and suitable for preventing rotation of the support body 10, in particular around the extension axis "S" of the support body 10. The main component 110 can be used operationally autonomously or in conjunction with the support component 120.

In particular, in the embodiment of the appended figures, the main component 110 is defined preferably by a polyhedral geometry, preferably a prismatic geometry, even more preferably a six-face geometry arranged in a reciprocally orthogonal manner. For example, in the appended figures the main component 110 has a substantially cuboid conformation. In other embodiments that are not illustrated, the main component can have other geometries.

In particular, the main component 110 comprises an upper face 110a and a lower face 110b arranged preferably parallel to the floor on which the support wall 2 is arranged, two side faces 110c and 110d preferably parallel, a frontal face 110e and a rear face 110f preferably parallel to the frontal surface 2a of the wall 2. The rear face 110f is adapted to be arranged adhering to the wall 2, and in particular to the frontal surface 2a so as to apply the thrust action "B" preferably in an extended manner against the frontal surface 2a of the wall 2.

The main component 110 defines the first seat 101, adapted to receive the first portion 11 of the support body 10, as a channel arranged along the lower face 110b of the main component 110, compatible in form with the support body 10 and of the arrangement thereof relative to the frontal surface 2a of the wall 2.

Preferably, the main component 110 can be hollow internally so as to require, advantageously, less material for its manufacture and to be lighter. The support component 120 is made in polyhedral form, substantially with six reciprocally orthogonal sides, and more precisely as a plate, comprising an upper side 120a and a lower side 120b that are substantially more extensive than the remaining sides and are arranged parallel to the floor, two lateral sides 120c and 120d, a frontal side 120e and a rear side 120f.

The support component 120 is couplable with the main component 110 by means of suitable connecting members, in particular having the upper face 120a reversibly connectable to the lower face 110b of the main component 110.

In this embodiment, the connecting members of the main component 110 comprise at least two hooks 111a and 111b, preferably arranged in the form of a "C" on the lower face 110, and with respective facing cavities, and adapted to slidingly receive between them the support component 120, which is provided in turn with two suitable sliding guides 121a and 121b arranged correspondingly along the lateral sides 120e and 120f. In particular, the support component 120 is inserted frontally, i.e. with the frontal side 120e facing the observer and the rear side 120f facing the frontal surface 2a of the wall relative to the main component 110, preferably until the rear side 120f adheres to the frontal surface 2a of the wall 2.

Once the support component 120 is connected to the main component 110, it exerts a fixing action by mechanical interference on the first portion 11 of the support body 10, preventing the latter from being subjected to rotational stress around the axis "S".

In the presence of the second transverse element 11d, the support component 120 defines a second seat 122 that is suitable for receiving the second transverse element 11d, to ensure simultaneously both translational and rotational anchoring of the support body 10 relative to the wall 2. In particular, this second seat 122 is in a channel that is compatible in shape with the second transverse element 11d and arranged on the rear face 120f of the support component 120. The arrangement enables the second transverse element 11*d* to be secured against both rotational and translational stresses, being in further assistance to the first portion 11 immune to rotations in relation to the "S" axis.

Preferably, and as for example shown in the appended figures, the support body 10 further comprises a third portion 13, defined between the first portion 11 and the second portion 12, defining a housing 14, for or a coupling element with, the fixing body 100.

Preferably, the fixing body 100 is at least partially inserted into the housing 14.

Preferably, the housing 14 has a geometry that is such as to be compatible in form with the fixing body 100, in other words so that the fixing body fills the housing 14 totally.

Preferably, the first portion 11 and/or the second portion 12 and/or the third portion 13 are made in the form of thread-like elements.

In the embodiment of the appended figures, the first portion 11, the second portion 12 and the third portion 13 are made in the form of thread-like elements.

Different embodiments can provide for each of these elements having different geometries, for example "I" or "L" or "V" or "C" or "U" or "M" geometries.

In the embodiment of the appended figures, the second portion 12 is made "as one piece" with the third portion 13 so as to define a fork geometry.

Preferably, the second portion 12 defines at least one tine of the fork geometry.

In other words, the third portion 13 is substantially linear and arranged transversely to the second portion 12.

With reference to the appended figures, the second portion 12 defines two tines. For each tine, there is a corresponding sub-portion 12*a*, insertable singly into a corresponding hole 3 on the frontal surface 2*a* and a second sub-portion 12*b*, being like a natural extension of the first sub-portion 12*a* and forming a corresponding rest 4.

The housing 14 is preferably defined as a planar substantially rectangular shape, comprised between the third portion 13 and the frontal surface 2*a* of the wall 2 where the fixing body 100 is partially inserted from above, or is inserted from the lower surface 110*b*.

In this arrangement, the thrust action "B" is exerted on a zone of the frontal surface 2*a* of the wall 2. The rest 4 helps anchor the device 1 on the wall 2, by means of a thrust action "C" on the rear surface 2*b* of the wall 2.

The second sub-portion 12*b* of the second portion 12 is oriented so as to obtain the rest 4 in an area arranged above the hole 3 traversed by the sub-portion 12*a*. The thrust "C" and the thrust "B" are symmetrical so that they form a grip around the wall 2.

By inserting the fixing body 100, or possibly the main component 110 from above, the first seat 101 is made to rest on the first portion of the support body 11 and couple therewith.

Preferably, the fixing body 100, or possibly the main component 110, comprises at least partially along the lateral perimeter, in other words at least along the frontal face 110*e* and/or the side faces 110*c* and 110*e*, a channel 112 suitable for receiving the third portion 13 of the support body 10, when the fixing body 100 is inserted into the housing 14 so as to exert retaining by mechanical interference.

Figure 1:
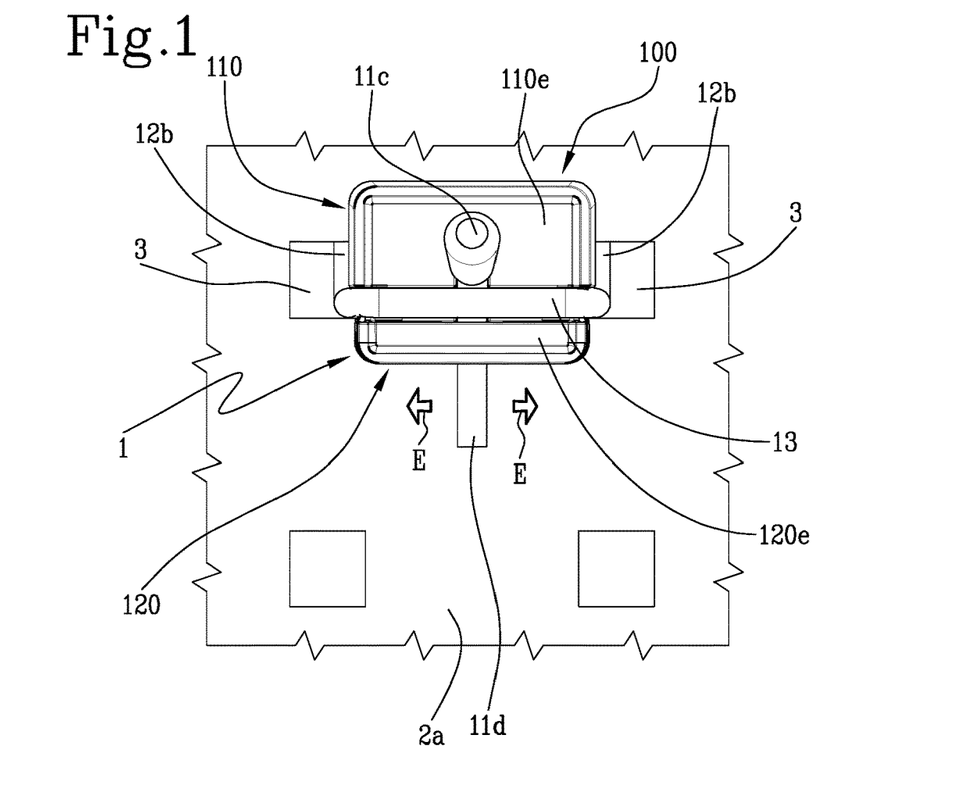
FIG. 1 is a frontal view of an object-hanging device coupled with a support wall provided with suitable holes that is the subject-matter of the present invention.
Figure 2:
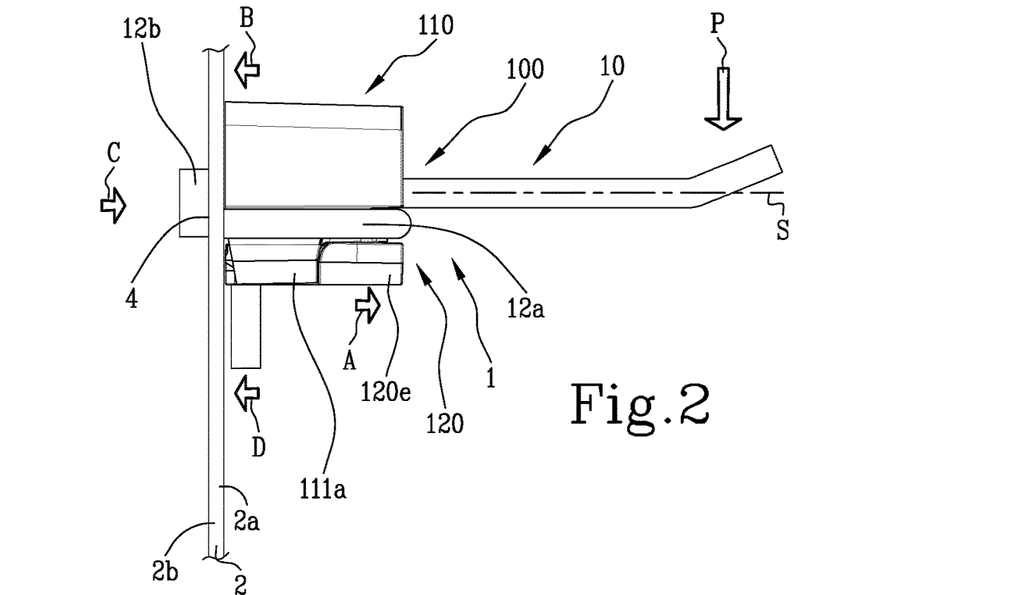
FIG. 2 shows a side view of the device of FIG. 1.
Figure 3:
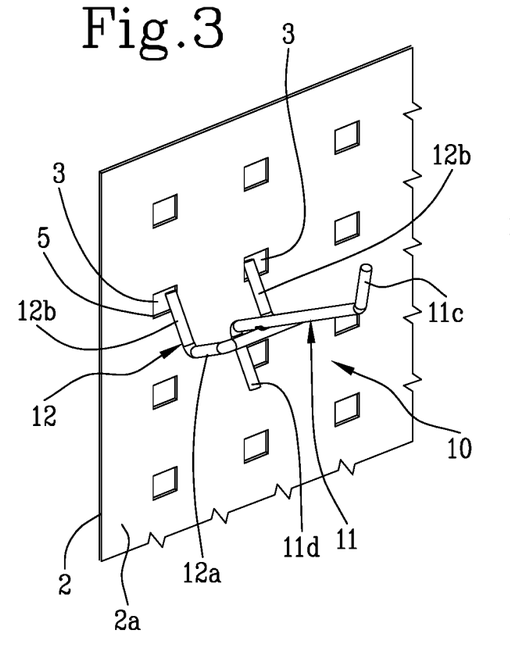
FIGS. 3, 4, 5, 6, 7, 8, 9 and 10 are views of the consecutive passages of the coupling and decoupling of the device shown in FIG. 1 with and from the support wall.
Figure 4:
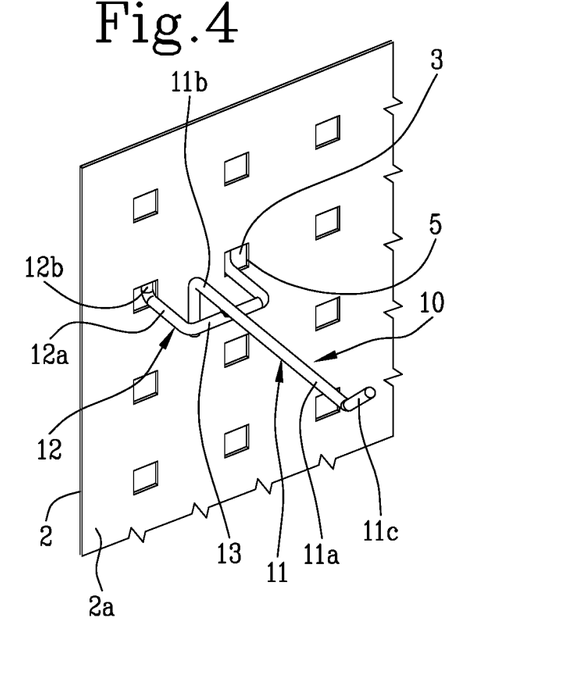
Figure 5:
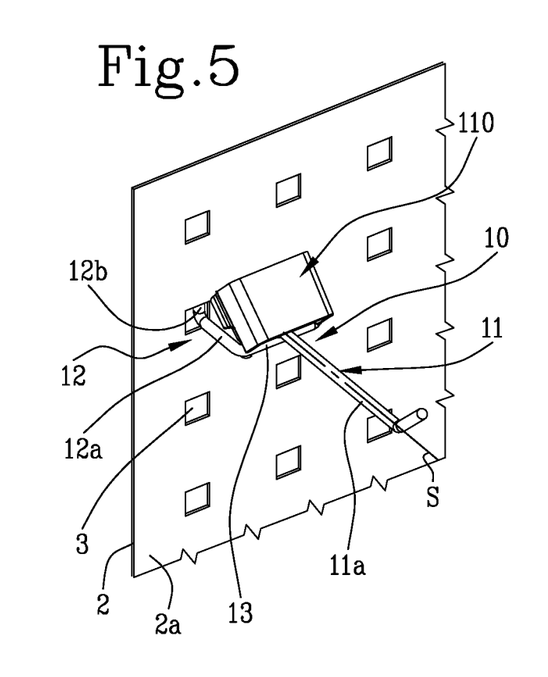
Figure 6:
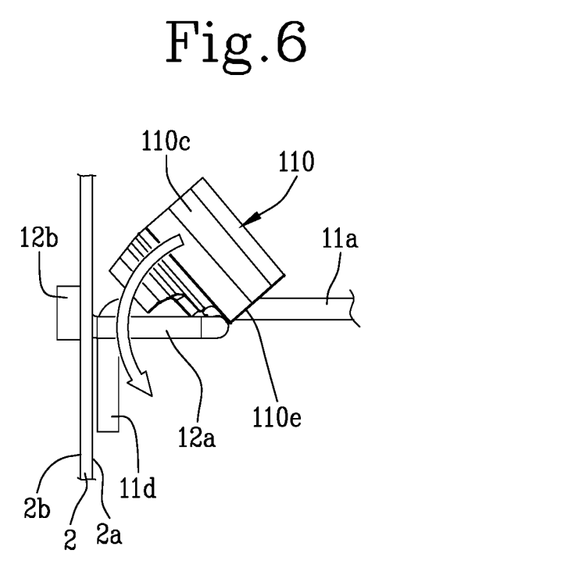
Figures 7, 8, 9, 10:
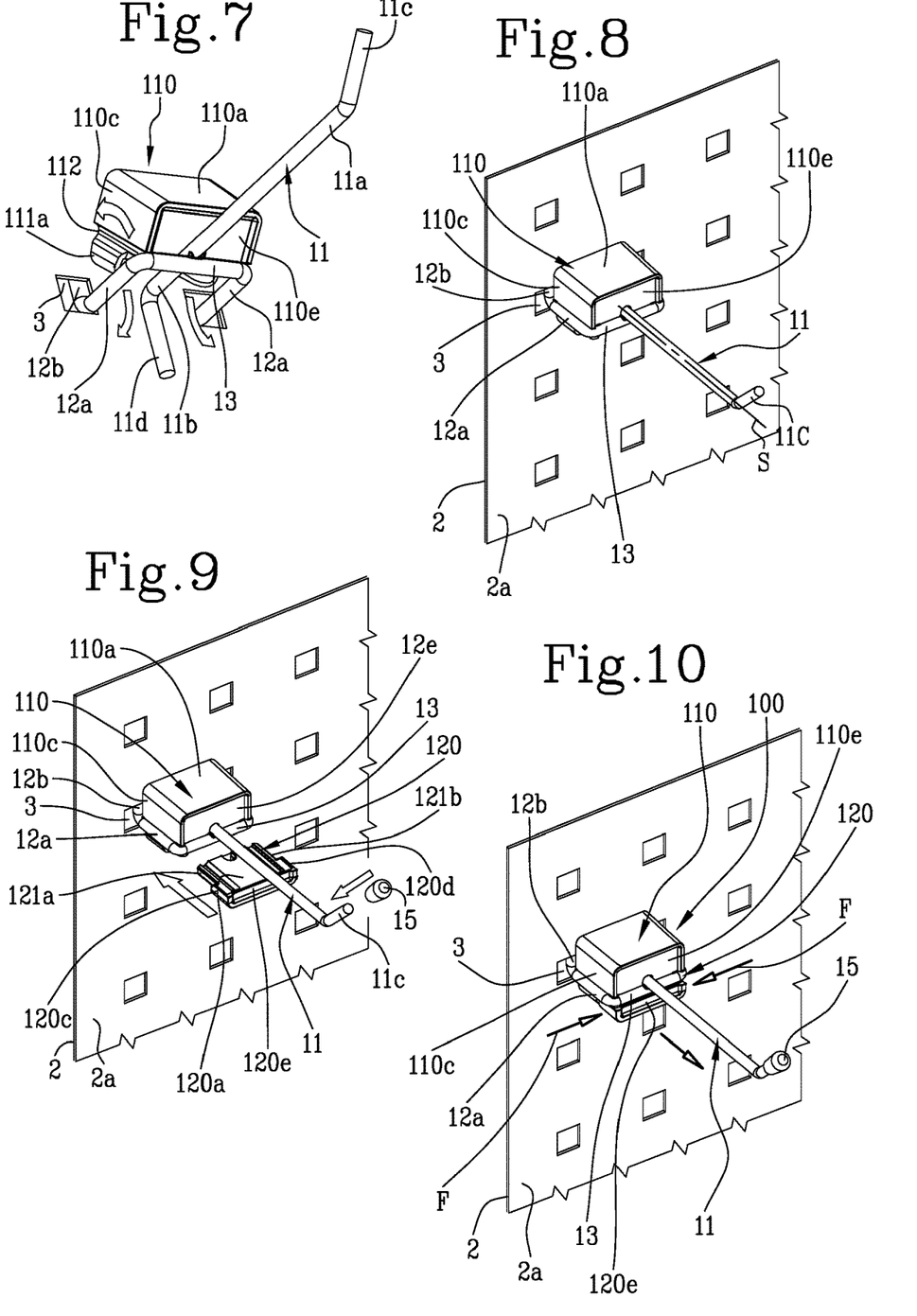
Figure 11:
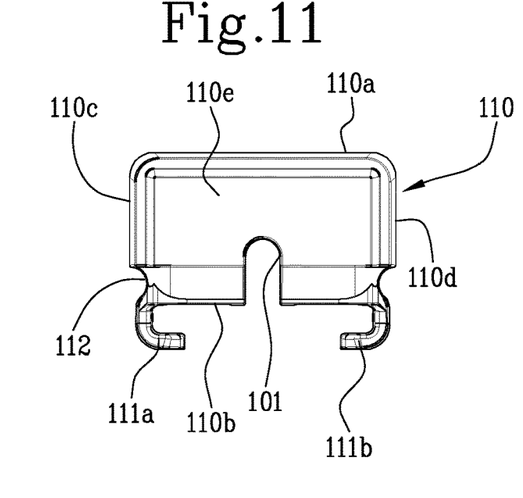
FIG. 11 is a view illustrating in a detailed frontal view the main component of the fixing body comprised in the device shown in FIG. 1.
Figure 12:
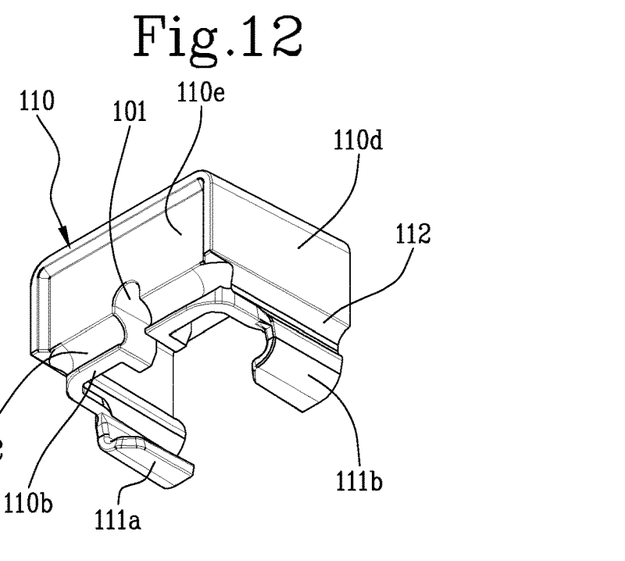
FIG. 12 is a view illustrating an oblique top view of the main component of the fixing body shown in FIG. 11.
Figure 13:
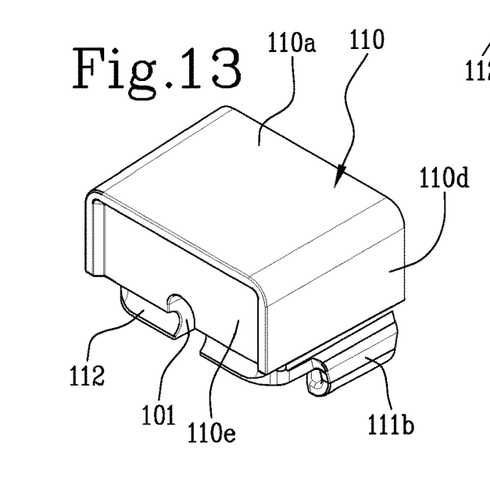
FIG. 13 is a view illustrating an oblique bottom view of the main component of the fixing body shown in FIGS. 11 and 12.
Figure 14:
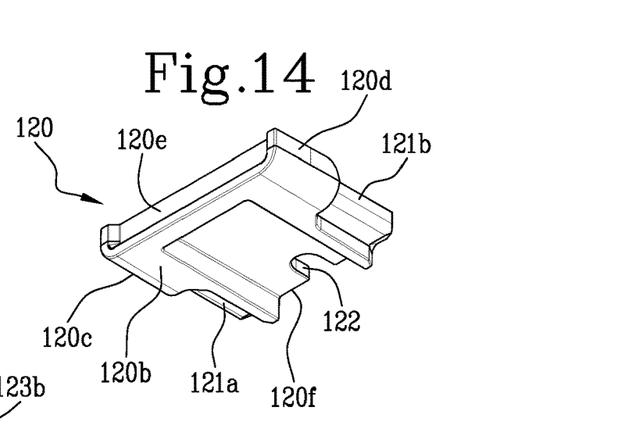
FIG. 14 is a view illustrating in a detailed bottom view the main component of the fixing body comprised in the device shown in FIG. 1.

Observing FIG. 6 or 7, the fixing body is inserted inside the housing 14 by first resting the frontal face 110*e* and the fixing body on the third portion 13, so that the third portion 13 engages with the channel 112. Subsequently, by means of rotation, all the perimeter of the fixing body 100 is engaged inside the housing 14 and the main component is engaged by means of mechanical interference with the frontal surface 2*a* of the wall 2.

In the embodiment illustrated in the appended figures, the fixing body 100, or possibly the main component 110, exerts the thrust action "A" also at least partially on the third portion 13.

Further, the fixing body 100, or possibly the main component 110, exerts a lateral thrust action "E" on the third portion 13, exerting anchoring that is free of possible lateral translations of the support body 10 and, consequently, of the device 1 relative to the wall 2.

In this embodiment, the third portion 13 and the first portion 11 are separate entities, which are reversibly connectable by mechanical interference. The fixing body 100 is thus further configured to maintain the third portion 13 and the first portion 11 coupled, helping in this mechanical interference. Alternatively, the third portion 13 and the first portion 11 can be made "of one piece". In the circumstances in which the support body 10 provides for the use of transverse elements, the third portion 13 defines a housing 14 in which at least one of the transverse elements is at least partially inserted inside the housing 14. In the embodiment of the appended figures, the second transverse element 11*d*, resting on the frontal surface 2*a* of the wall 2, is inserted into the housing 14 defined by the third portion 13. The second seat 122, arranged on the support component 120, is suitable for coupling through shape coupling with the second transverse element 11*d* to fix stably the transverse element 11*d* to the wall 2 and prevent rotating and/or translating against the wall 2, and accordingly also rotating around the "S" of the support body 10.

Figure 15:
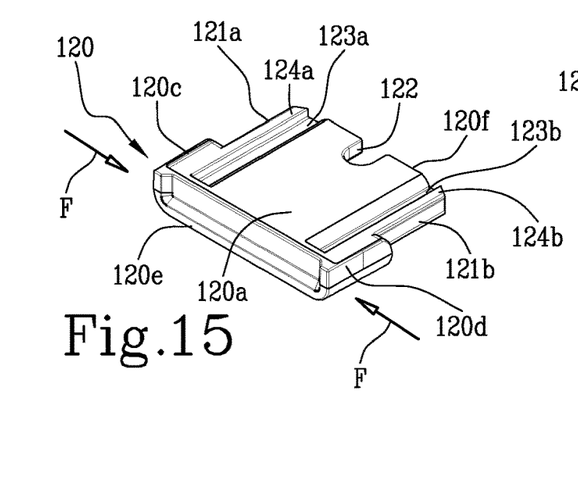
FIG. 15 is a view illustrating an oblique top view of the support component of the fixing body shown in FIG. 14.

With reference to FIGS. 10 and 15, the support component 120 comprises a first slit 123*a* and a second slit 123*b* arranged opposite near the lateral sides 120*c* and 120*d*.

This first and second slit define near lateral sides 120*c* and 120*d* respectively a first fin 124*a* and a second fin 124*b*, configured to be flexibly deformable with respect to the support component 120.

The fins are configured to engage with and disengage from the cavities defined respectively by the hooks 111*a* and 111*b*.

The first and the second slit 123*a*, 123*b* are made with a course that is linear and parallel to the sliding guides 121*a* and 121*b*.

Preferably, the first and the second slit 123*a* and 123*b* are through slits relative to the support component 120.

The support fins 124*a*, 124*b* engage by mechanical interference respectively with the cavities defined by the hooks 111*a* and 111*b*, enabling the support component 120 to be fixed in position relative to the main component 110.

The fins 124*a*, 124*b* are further configured to disengage respectively from the cavities defined by the hooks 111*a* and 111*b*.

The lateral fins (124*a*, 124*b*) are flexibly deformable relative to the support component (120) so as to engage, in use, the lateral fins (124*a*, 124*b*) with the main component (110) and enable the lateral fins (12*a*, 124*b*) to disengage from the main component (110).

In other words, the first fin 124*a* and the second fin 124*b* are movable in relation to one another so as to reduce a distance therebetween so as to permit the fins to pass through the cavities defined by the hooks 111*a* and 111*b*.

Preferably, said disengagement occurs by means of a manual compression action "F" of the fins 124*a*, 124*b* to lessen the mechanical interference between the fins 124*a*, 124*b* and the hooks 111*a* and 111*b*.

Therefore, a pressure exerted by a user (i.e. the aforesaid manual compression action "F") enables this distance between the fins 124*a* and 124*b* to be so reduced that the support component 120 can be inserted or extracted to engage with or disengage from the main component 110.

In other words, during engagement of the support component 120 with the main component 110, the first fin 124*a* and the second fin 124*b* are moved away from one another so as to define interference with the hooks 111*a* and 111*b* that prevents involuntary extraction thereof and only a manual compression action "F" thereof would allow an approach thereof to enable extraction thereof so as to disengage the support component 120 from the main component 110.

Advantageously, this configuration permits an engagement and a disengagement that are easily actuatable by the support component 120 relative to the main component 110 whereas it simultaneously stabilises in position the main component and, in turn, the support body 10.

The device 1 can comprise auxiliary elements adapted to improve the arrangement and the support of the external body with or on the support body 10. Such auxiliary elements can comprise a rounded portion suitably arranged on the first portion 11, and in particular on the first end 11*a* or of the first transverse element 11*c*. This rounded portion comprises a cross section above the cross section of the first end 11*a* or of the first transverse element 11*c* so as to improve retaining of the external body and prevent an involuntary disengagement of the external body from the device 1.

This rounded portion can be integrated with the first portion 11 or be integratable as an accessory body 15.

Other alternative auxiliary elements that are integrated or are integratable with the first portion 11 of the support body 10 can comprise auxiliary bodies provided with coupling holes or auxiliary bodies provided with grippers.

Further, the device 1 can also be employed by means of interposing a container that is clad on the first portion 11 and hanging on said wall 2.

Advantageously, the device 1 is capable of overcoming the drawbacks which have emerged from the prior art.

Advantageously, using a device 1 comprising a support body 10 and a fixing body 100 that is reversibly engageable with the support body 10 permits reversible coupling with the support wall 2, anyway ensuring that the device 1 is stably anchored on the wall and is not subjected to involuntary movements, whether in the event of impacts or of vibrations.

Advantageously, the above device 1 is easy to install and uninstall.

Further, the device 1 is realizable easily and economically.

Further, the device 1 is easily reusable to support objects having different shapes, dimensions and functions.

The invention claimed is:

1. An object-hanging device (1), intended to couple reversibly with a support wall (2) with a vertical extension and equipped with suitable through holes (3), wherein said device (1) comprises:
   a support body (10) comprising,
   a first portion (11) configured to make a rest element and/or a stop for an object;
   a second portion (12) configured to make a reversible connection between said support body (10) and said support wall (2);
   a fixing body (100) reversibly engageable or engaged with said first portion (11) and/or with said second portion (12) in a use configuration of said object-hanging device (1), wherein said second portion (12) is at least partially inserted inside at least one of said holes (3) so as to define the anchoring of said support body (10) on said wall (2);
   wherein said fixing body (100), in said use configuration, exerts a first thrust action (A) and a second thrust action (B), opposite said first thrust action (A), respectively acting on said first portion (11) and/or on said second portion (12), and on said wall (2) so as to define stable anchoring of said support body (10) on said wall (2);
   wherein said fixing body (100), in said use configuration, exerts a first thrust action (A) and a second thrust action (B), opposite said first thrust action (A), respectively acting on said first portion (11) and/or on said second portion (12), and on said wall (2) so as to define stable anchoring of said support body (10) on said wall (2),
   wherein said first portion (11) extends along a longitudinal axis(S) thereof and has a first end (11*a*) and a second end (11*b*) provided with respective transverse elements (11*c* and 11*d*), said transverse elements (11*c* and 11*d*), being opposite one another relative to said longitudinal axis (S),
   wherein said fixing body (100) comprises at least a first seat (101) suitable for receiving a longitudinal portion of said first portion (11) of the support body (10),
   wherein said fixing body (100) comprises a main component (110), suitable for exerting said first thrust action (A) and said second thrust action (B), and a support component (120) reversibly connected to said main component (110), and
   wherein said main component defines said first seat (101) and wherein said support component (120) defines a second seat (122) that is suitable for receiving one of said transverse elements (11*d*).

2. The device (1) according to claim 1, wherein said fixing body (100), in said use configuration, is further configured to prevent rotation of said support body (10).

3. The device (1) according to claim 2, wherein said support component (120) is suitable for preventing rotation of said support body (10).

4. The device (1) according to claim 1, wherein said support body (10) comprises a third portion (13), defined between said first portion (11) and said second portion (12), defining a housing (14) for, or an element for coupling with, said fixing body (100).

5. The device (1) according to claim 4, wherein said second portion (12) is made in a single piece with said third portion (13) so as to define a fork geometry, wherein at least said second portion (12) defines at least one tine of said fork geometry.

6. The device (1) according to claim 4, wherein said third portion (13) defines a housing (14) for said fixing body (100) and wherein said fixing body (100) comprises at least partially along a perimeter a channel (112) adapted to receive said third portion (13) of said support body (10).

7. The device (1) according to claim 4, wherein said first portion (11) and/or said second portion (12) and/or said third portion (13) are made in the form of threadlike elements having an "I" or an "L" or a "V" or a "C" or a "U" or an "M"-shaped geometry.

8. The device (1) according to claim 4, wherein said third portion (13) and said first portion (11) are reversibly connectable by mechanical interference, and wherein said fixing body (100) is further configured to maintain said mechanical interference between the third portion (13) and the first portion (11).

9. The device according to claim 4, wherein said third portion (13) defines a housing (14) and wherein at least one of said transverse elements (11d) is at least partially inserted inside said housing (100).

10. The device according to claim 3, wherein the support component is couplable with said main component (110) by suitable connecting members, said connecting members comprising:
- at least two "C"-shaped hooks (111a and 111b), arranged on the main component (110) and with respective facing cavities;
- two sliding guides (121a and 121b), arranged correspondingly along two lateral sides (120c and 120d) of said support component (120);
- wherein said hooks (111a and 111b) are adapted to slidingly receive between them the support component (120) and realize a connection therewith by mechanical interference.

11. The device according to claim 10, wherein the support component (120) comprises a first slit (123a) and a second slit (123b) defining a first lateral fin (124a) and a second lateral fin (124b) that are arranged respectively near said lateral sides (120e and 120d),
- said lateral fins (124a, 124b) being flexibly deformable relative to said support component (120) so as to realise, in use, an engagement of the lateral fins (124a, 124b) with the main component (110) and permit disengagement of the lateral fins (124a, 124b) from the main component (110).

* * * * *